United States Patent [19]

Takase et al.

[11] 4,444,974

[45] Apr. 24, 1984

[54] ROOM TEMPERATURE CURING COMPOSITION

[75] Inventors: Junji Takase; Toshifumi Hirose; Katsuhiko Isayama, all of Kobe, Japan

[73] Assignee: Kanegafuchi Kagaku Kogyo Kabushiki Kaisha, Osaka, Japan

[21] Appl. No.: 446,976

[22] Filed: Dec. 6, 1982

[51] Int. Cl.$^3$ .............................................. C08G 77/04
[52] U.S. Cl. ...................................... 528/33; 525/409; 525/477; 528/18; 528/34; 528/32; 528/901
[58] Field of Search ................. 525/409, 477; 528/18, 528/33, 34, 901, 32

[56] References Cited

U.S. PATENT DOCUMENTS 4,302,571  11/1981  Arai et al. .......................... 525/477

*Primary Examiner*—Melvyn I. Marquis
*Attorney, Agent, or Firm*—Armstrong, Nikaido, Marmelstein & Kubovcik

[57] ABSTRACT

A room temperature curing composition comprising a polyoxyalkylene polymer having a silicon-containing hydrolyzable group and a hydrolyzable silicon compound as a stabilizer, which is stable in a closed system and is curable by exposure to moisture. The stabilizer has a higher hydrolysis reactivity than the polyoxyalkylene polymer and serves as a dehydrating agent, and therefore the storage stability can be remarkably improved.

8 Claims, No Drawings

ROOM TEMPERATURE CURING COMPOSITION

BACKGROUND OF THE INVENTION

The present invention relates to a room temperature curing composition, and more particularly to a one component room temperature curing composition which contains a polyoxyalkylene polymer having a silicon-containing hydrolyzable group and is curable by absorption of moisture in the atmosphere.

Polyoxyalkylene polymers having a silicon-containing hydrolyzable group which are curable to change into rubber-like materials by exposure to moisture in the atmosphere are known. Compositions containing such polyoxyalkylene polymers are for instance usable as sealants for building.

As sealants, there are known a two component type that a main component is admixed just before use with a hardener, and a one component type that a main component is previously admixed with a hardener under anhydrous condition and the mixture is stable in a closed state, while hardens by absorbing moisture upon exposure to the atmosphere. Two component compositions have the disadvantages that mixing of two components is troublesome and the mixture must be used up in a certain period. One component compositions are convenient for use in that a mixing procedure is not necessary and the remnant can be stored in a closed container and reused, but the storage stability is in a question.

It is an object of the present invention to provide a room temperature curing composition having an excellent storage stability.

A further object of the invention is to provide a room temperature curing composition of a polyoxyalkylene polymer having a silicon-containing hydrolyzable group which is curable with moisture and can be stably stored in a closed state for a long term.

Another object of the invention is to provide a one component room temperature curing composition which is curable with moisture and can be stably stored in a closed state for a long term.

These and other objects of the present invention will become apparent from the description hereinafter.

SUMMARY OF THE INVENTION

In accordance with the present invention, there is provided a room temperature curing composition comprising (A) a polyoxyalkylene polymer having a silicon-containing hydrolyzable group and (B) a hydrolyzable silicon compound.

The composition of the invention has an excellent storage stability, and additives such as a filler can be incorporated into the composition without previously drying them.

DETAILED DESCRIPTION

A hydrolyzable silicon compound is employed as a stabilizer in the present invention. The hydrolyzable silicon compound can decrease water in the system, e.g. water included naturally in additives such as a filler and a plasticizer, in a short period of time by causing a condensation reaction with water in the presence of a silanol condensation catalyst as a hardener. That is to say, the hydrolyzable silicon compound has in general a higher hydrolysis reactivity than the silicon-containing hydrolyzable group of a polyoxyalkylene polymer having a silicon-containing hydrolyzable group, and reacts with water included in the system in preference to the polyoxyalkylene polymer to serve as a dehydrating agent. Also, the hydrolyzable silicon compound and the partial hydrolysis product thereof which remain in the system, function to stabilize the storability of the composition for a long term.

The hydrolyzable silicon compounds used in the present invention as a component (B) are low molecular silicon compounds having a hydrolyzable functional group which reacts in the presence of water. The hydrolyzable silicon compounds having a molecular weight of not more than 300 are preferable.

The hydrolyzable silicon compound is employed in such an amount that the total number of moles of the hydrolyzable functional group is at least 2 times the number of moles of water present in the system. Since, if the hydrolyzable silicon compound is too much, it tends to lower the physical properties of the cured product as a sealant and also to lower the curing rate, the upper limit of the amount of the hydrolyzable silicon compound is determined in the light of the desired physical properties of cured products and curing rate. Preferably, the hydrolyzable silicon compound is employed in such an amount that the total number of moles of the hydrolyzable functional group thereof is 2 to 8 times, especially 2.5 to 5 times, the number of moles of water present in the system. In general, the hydrolyzable silicon compound is employed in an amount of 0.01 to 20 parts by weight, preferably 0.1 to 10 parts by weight, per 100 parts by weight the polyoxyalkylene polymer (A).

The hydrolyzable functional groups of the hydrolyzable silicon compounds (B) include, for instance, a halogen, an alkoxyl group, an acyloxy group, a ketoxymate group, an amino group, an aminoxy group, an amide group, a mercapto group, an alkenyloxy group, and the like. Other groups than the hydrolyzable functional groups, e.g. an epoxy-containing group, an amino-containing group, an acryloyloxy-containing group, an methacryloyloxy-containing group and a mercapto-containing group, may be attached to silicon atom. The hydrolyzable silicon compounds (B) used in the present invention are compounds of the general formula:

$$R_n\text{-Si-X}_{4-n}$$

wherein R is a monovalent organic group having 1 to 12 carbon atoms, X is a halogen or a group selected from an alkoxyl group, an acyloxy group, a ketoxymate group, an amino group, an aminoxy group, an amide group, a mercapto group and an alkenyloxy group, and n is 0 or an integer of 1 to 3, and condensed partial hydrolysis products of the compounds of the above general formula. These hydrolyzable silicon compounds and the condensed partial hydrolysis products may be employed alone or in admixture thereof. Representative examples of the hydrolyzable silicon compound (B) used in the present invention are, for instance, $CH_3SiCl_3$, $Si(OCH_3)_4$, $CH_3Si(OCH_3)_3$, $Si(OC_2H_5)_4$, $CH_2=CHSi(OOCCH_3)_3$,

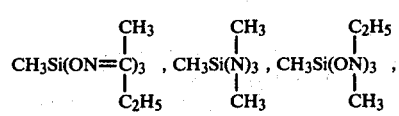

-continued $$CH_3Si(N-\underset{\underset{O}{\|}}{C}-CH_3)_3, \quad CH_3Si(O\underset{\underset{CH_3}{|}}{C}=CH_2)_3,$$

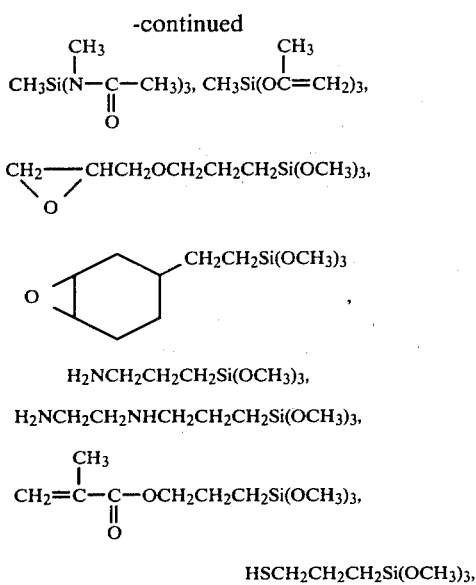

$H_2NCH_2CH_2CH_2Si(OCH_3)_3$, $H_2NCH_2CH_2NHCH_2CH_2CH_2Si(OCH_3)_3$, $$CH_2=C-\underset{\underset{O}{\|}}{\overset{\overset{CH_3}{|}}{C}}-OCH_2CH_2CH_2Si(OCH_3)_3,$$

$HSCH_2CH_2CH_2Si(OCH_3)_3$, and condensed partial hydrolysis products of these compounds.

The polyoxyalkylene polymer used as a component (A) in the present invention is a polymer having substantially a structural unit of the formula: $-R^1O-$, wherein $R^1$ is an alkylene group having 1 to 4 carbon atoms, and having a silicon-containing hydrolyzable end or pendant groups and a molecular weight of 300 to 15,000. The term "substantially" as used above means that the polymer may contain structural units other than the $R^1O$ unit in the main chain. Usually, the polyoxyalkylene polymer (A) contains at least 50% by weight, especially 80% by weight, of the $R^1O$ units. Representative examples of the silicon-containing hydrolyzable group of the polyoxyalkylene polymer (A) are, for instance, groups of the general formula:

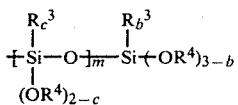

wherein $R^3$ is a substituted or unsubstituted monovalent organic group having 1 to 20 carbon atoms or an organosiloxy group, $R^4$ is a saturated or unsaturated monovalent hydrocarbon group having 1 to 20 carbon atoms, "b" is 0, 1 or 2, "c" is 0, 1 or 2, and "m" is 0 or an integer of 1 to 18, preferably groups of the general formula:

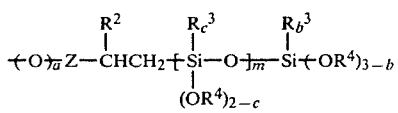

wherein Z is -R-, -R-O-R'-,

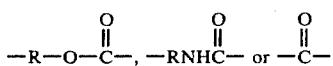

in which R and R' are the same or different and each is a bivalent hydrocarbon group having 1 to 20 carbon atoms, $R^2$ is hydrogen, a substituted or unsubstituted monovalent organic group, especially hydrocarbon group, having 1 to 20 carbon atoms or a triorganosiloxy group, $R^3$ is a substituted or unsubstituted monovalent organic group having 1 to 20 carbon atoms or an organosiloxy group, $R^4$ is a saturated or unsaturated monovalent hydrocarbon group having 1 to 20 carbon atoms, "a" is 0 or 1, "b" is 0, 1 or 2, "c" is 0, 1 or 2, and "m" is 0 or an integer of 1 to 18. Processes for the preparation of the polyoxyalkylene polymer having such an end group are disclosed, for instance, in Japanese Unexamined Patent Publication (Tokkyo Kokai) No. 156599/1975 and No. 123620/1980. The polyoxyalkylene polymer having such a pendant group is prepared, for instance, by copolymerizing an alkylene glycol with allyl glycidyl ether and subjecting the product to hydrosylylation.

A silanol condensation catalyst may be incorporated in the composition of the present invention as a hardener to provide a one component room temperature curing composition. Examples of the silanol condensation catalyst are, for instance, a metal salt of a carboxylic acid such as tin octylate, tin stearate, iron naphthenate or lead octylate, a tetravalent organotin such as di-n-butyl tin dilaurate or di-n-butyl tin diphthalate, an amine such as laurylamine or ethanolamine, and alkyltitanates. These catalysts may be employed alone or in admixture thereof. In the present invention, the silanol condensation catalyst not only serves as a catalyst for a crosslinking reaction of the polyoxyalkylene polymer (A), but also accelerates a reaction of the hydrolyzable silicon compound (B) with water in the stage prior to the crosslinking reaction to remove water present in the composition.

Usual fillers and usual plasticizers may be incorporated in the composition of the present invention. Examples of the filler used in the present invention are, for instance, calcium carbonate, kaolin, talc, titanium dioxide, aluminum silicate, carbon black, and the like. The filler is employed in an amount of 0 to 300 parts by weight, especially 0.1 to 300 parts by weight, per 100 parts by weight of the polyoxyalkylene polymer (A). Examples of the plasticizer used in the present invention are, for instance, dioctyl phthalate, butylbenzyl phthalate, chlorinated paraffin, epoxidized soybean oil, and the like. The plasticizer is employed in an amount of 0 to 200 parts by weight, especially 0.1 to 200 parts by weight, per 100 parts by weight of the polyoxyalkylene polymer (A). In the present invention, fillers and plasticizers can be employed without previously dehydrating them. If it is possible to decrease the water content by a simple procedure, fillers and plasticizers dehydrated by a procedure such as heat drying may be of course employed. In that case, it is possible to decrease the amount of the hydrolyzable silicon compound (B) to be used.

The composition of the present invention may contain various other additives, e.g. antisagging agent such as hydrogenated castor oil or silicic acid anhydride, antioxidant, ultraviolet absorbent, radical inhibitor, and a peroxide decomposer. For the purpose of adjusting the physical properties of the cured product, the composition of the invention may also contain reactive silicon compounds disclosed in Japanese Unexamined Patent Publication No. 129247/1978, polysiloxanes disclosed in Japanese Unexamined Patent Publication No. 21453/1980 and ultraviolet radiation curing resins disclosed in Japanese Unexamined Patent Publication No. 36241/1980.

The composition of the present invention is prepared usually by admixing the polyoxyalkylene polymer (A) with additives, and then adding the hydrolyzable silicon compound (B) to the mixture with agitation in a closed system, thereby causing the hydrolyzable silicon compound (B) to react with water present in the system to remove it. In case of incorporating a hardener into the composition, the hardener is added to the mixture after adding the hydrolyzable silicon compound (B) to the mixture of the polyoxyalkylene polymer and additives.

The present invention is more specifically described and explained by means of the following Examples in which all parts are by weight unless otherwise noted. It is to be understood that the present invention is not limited to the Examples, and various changes and modifications may be made in the invention without departing from the spirit and scope thereof.

EXAMPLE 1

To an oxypropylene polymer having

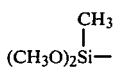

group in 80% of the whole ends and having an average molecular weight of 8,000 were added 34 parts of dioctyl phthalate, 140 parts of calcium carbonate, 20 parts of titanium dioxide, 4 parts of hydrogenated castor oil as an antisagging agent, 1 part of 2,2'-methylene-bis(4-methyl-6-t-butylphenol) as an antioxidant (commercially available under the commercial name "Nocrac NS-6" made by Ouchi Shinko Kabushiki Kaisha) and 1 part of bis(2,2,6,6-tetramethyl-4-piperidine)sebacate as an antioxidant (commercially available under the commercial name "Sanol LS-770" made by Sankyo Kabushiki Kaisha), per 100 parts of the oxypropylene polymer. They were uniformly blended in a sealed agitator. All of these ingredients were employed without dehydration. After the completion of the blending, the mixture contained 2,000 p.p.m. of water. To the mixture was added 6.9 parts of tetraethylorthosilicate, and was uniformly dispersed in the mixture by the agitator. The number of moles of the hydrolyzable functional group was 3.8 times the number of moles of water present in the mixture. Then, 1 part of di-n-butyl tin dilaurate was added to the mixture, and the mixture was agitated for 1 hour. The mixture was taken out from the sealed agitator without coming in contact with the outside air, and was stored in a closed container at 50° C. The mixture was stable for more than 1 month. When the stored mixture was exposed to the outside air, it hardened for 6 hours.

According to Japanese Industrial Standard (JIS) A 5758, a H type specimen was prepared from the mixture and aged at 23° C. and a humidity of 60% for 14 days and then at 30° C., for 14 days, and it was subjected to a tension test at a speed of 50 mm./minute. The modulus at 50% elongation was 3.7 kg./cm.$^2$, the tensile strength at breaking was 7.0 kg./cm.$^2$ and the elongation was 230%.

EXAMPLE 2

To 100 parts of an oxypropylene polymer having

group in 80% of the whole ends and having an average molecular weight of 8,000 were added 34 parts of dioctyl phthalate, 140 parts of calcium carbonate, 20 parts of titanium dioxide, 4 parts of hydrogenated castor oil as an antisagging agent, and 1 part of each of Nocrac NS-6 and Sanol LS-770 as an antioxidant. They were uniformly blended in a sealed agitator. All of these ingredients were employed without dehydration. After the completion of the blending, the water content of the mixture was 2,500 p.p.m. To the mixture was addd 8.6 parts of γ-glycidoxypropyltrimetyoxysilane, and was uniformly dispersed in the mixture by the agitator. The number of moles of the hydrolyzable functional group was 2.6 times the number of moles of water present in the mixture. Di-n-butyl tin phthalate dissolved in an equimolar amount of dioctyl phthalate by heating was then added to the mixture in an amount of 2 parts, and the mixture was agitated for 1 hour. The thus obtained mixture was stored at 50° C. in a closed container. The mixture was stable for more than 1 month. The mixture exposed to the outside air hardened in 1 hour. A H type specimen was prepared and subjected to the tension test in the same manner as in Example 1. The cured product had a modulus at 50% elongation of 3.3 kg./cm.$^2$, a tensile strength at breaking of 6.5 kg./cm.$^2$ and an elongation of 470%.

EXAMPLE 3

To 100 parts of an oxypropylene polymer having

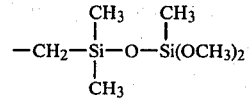

group in 80% of the whole ends and having an average molecular weight of 8,000 were added 34 parts of dioctyl phthalate, 140 parts of calcium carbonate, 20 parts of titanium dioxide, 4 parts of hydrogenated castor oil as an antisagging agent, and 1 part of each of Nocrac NS-6 and Sanol LS-770 as an antioxidant. They were uniformly blended by a sealed agitator. All of these ingredients were employed without dehydration. After the completion of blending, the mixture contained 2,000 p.p.m. of water. To the mixture was added 5.0 parts of vinyltri(isopropenyloxy)silane of the formula:

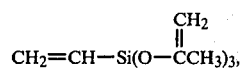

and was uniformly dispersed in the mixture by the agitator. The number of moles of the hydrolyzable functional group was 4.0 times the number of moles of water present in the mixture. After adding 1 part of di-n-butyl tin dilaurate, the mixture was agitated for 1 hour. The mixture was taken out from the sealed agitator without coming into contact with the outside air, and was stored at 50° C. in a closed container. The mixture was stable for more than 1 month. The mixture exposed to the outside air changed to a tack free mass in 3 hours. A H type specimen was prepared and subjected to the tension test in the same manner as in Example 1. The cured product had a modulus at 50% elongation of 4.1 kg./cm.$^2$, a tensile strength at breaking of 6.7 kg./cm.$^2$ and an elongation of 420%.

COMPARATIVE EXAMPLE 1

The procedure of Example 1 was repeated except that tetraethylorthosilicate was not employed. The obtained mixture was stored at 50° C. in a closed container, but it completely gelled after 3 days.

COMPARATIVE EXAMPLE 2

The procedure of Example 1 was repeated except that tetraethylorthosilicate was employed in an amount of 3.1 parts, namely in such an amount that the number of moles of the hydrolyzable functional group was 1.7 times the number of moles of water present in the system. The obtained mixture was stored in a closed container at 50° C., but it had an increased viscosity after a week and was not good for use.

COMPARATIVE EXAMPLE 3

The procedure of Example 2 was repeated except that γ-glycidoxypropyltrimethoxysilane was employed in an amount of 4.5 parts, namely in such an amount that the number of moles of the hydrolyzable functional group was 1.5 times the number of moles of water present in the system. The obtained mixture was stored in a closed container at 50° C., but it had an increased viscosity after a week and was not good for use.

In addition to the ingredients used in the Examples, other ingredients can be used in the Examples as set forth in the specification to obtain substantially the same results.

What we claim is:

1. A room temperature curing composition comprising (A) a polyoxyalkylene polymer having a silicon-containing hydrolyzable group and (b) a hydrolyzable silicon compound,
    wherein said polyoxyalkylene polymer (A) has substantially a structural unit of the formula: —R′O—, wherein R′ is an alkylene group having 1 to 4 carbon atoms, with said silicon-containing hydrolyzable group of the general formula:

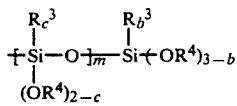

wherein R$^3$ is a substituted or unsubstituted monovalent organic group having 1 to 20 carbon atoms or an organosiloxy group, R$^4$ is a substituted or unsubstituted monovalent hydrocarbon group having 1 to 20 carbon atoms, b is 0, 1 or 2; c is 0, 1 or 2; and m is 0 or an integer of 1 to 18, and
    wherein said hydrolyzable silicon compound (B) is a member selected from the group consisting of compounds of the general formula:

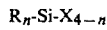

wherein R is a monovalent organic group having 1 to 12 carbon atoms, X is a halogen, an alkoxyl group, an acyloxy group, a ketoxymate group, an amino group, an aminoxy group, an amide group, a mercapto group or an alkenyloxy group, and n is 0 or an integer of 1 to 3, and condensed partial hydrolysis products thereof.

2. The composition of claim 1, wherein said hydrolyzable silicon compound is a silicon compound having a hydrolyzable functional group selected from the group consisting of a halogen, an alkoxyl group, an acyloxy group, a ketoxymate group, an amino group, an aminoxy group, an amide group, a mercapto group and an alkenyloxy group.

3. The composition of claim 1, wherein said hydrolyzable silicon compound is a member selected from the group consisting of CH$_3$SiCl$_3$, Si(OCH$_3$)$_4$, CH$_3$Si(OCH$_3$)$_3$, Si(OC$_2$H$_5$)$_4$, CH$_2$=CHSi(OOCCH$_3$)$_3$,

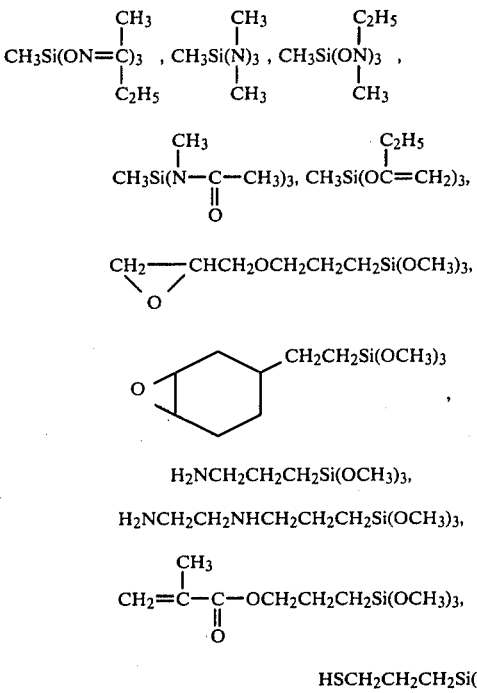

HSCH$_2$CH$_2$CH$_2$Si(OCH$_3$)$_3$ and condensed partial hydrolysis products thereof.

4. The composition of claim 1, wherein said hydrolyzable silicon compound is present in such an amount that the total number of moles of the hydrolyzable functional group thereof is at least 2 times the number of moles of water included in said composition.

5. The composition of claim 1, which contains (C) 0 to 300 parts by weight of a filler and (D) 0 to 200 parts by weight of a plasticizer per 100 parts by weight of the polyoxyalkylene polymer (A).

6. The composition of claim 1, which contains 0.1 to 10 parts by weight of a silanol condensation catalyst per 100 parts by weight of the polyoxyalkylene polymer (A).

7. The composition of claim 1, wherein water included in the polyoxyalkylene polymer (A) is caused to react with the hydrolyzable silicon compound (B).

8. The composition of claim 7, wherein the reaction of water with the hydrolyzable silicon compound (B) is conducted in the presence of a silanol condensation catalyst.

* * * * *